United States Patent Office 2,926,150
Patented Feb. 23, 1960

2,926,150

PLASTIC ASBESTOS TILE CONTAINING ROSIN-ESTER MODIFIED PHENOL-FORMALDEHYDE RESIN AND A VINYL RESIN

Robert L. Lerch, East Hempfield Township, Lancaster County, Pa., assignor to Armstrong Cork Company, Lancaster, Pa., a corporation of Pennsylvania No Drawing. Application May 1, 1957
Serial No. 656,205

3 Claims. (Cl. 260—19)

This invention relates to a plastic asbestos tile. More particularly, the invention relates to a plastic asbestos tile, the binder of which is comprised of a mixture of vinyl resin and rosin-ester modified phenol-formaldehyde resin.

This application is a continuation-in-part of my patent application Serial No. 369,242, filed July 20, 1953, entitled "Plastic Asbestos Tile."

Resilient plastic floor tiles and wall tiles are well-known to the art, having been made for a number of years from various plastic compositions. Generally speaking, the composition of such tile comprises about 70% to 80% by weight filler, and about 20% to 30% by weight binder. One recent development in the plastic tile art has been the introduction of vinyl resin plastic tiles, and such tiles generally contain a binder in which the resin component is usually about 50% to about 100% vinyl resin, such as vinyl chloride-vinyl acetate copolymer and polyvinyl chloride. While such tiles are characterized by many desirable properties, they are rather difficult to manufacture without the use of heavy duty mixers such as Banbury mixers and, in addition, are quite costly due to the large quantity of vinyl chloride resin required to form the binder of these materials. In addition, due to the presence of large quantities of vinyl resins in the tile compositions, it is essential to utilize heavy equipment in both the milling and calendering steps normally employed in the manufacture of plastic tiles. This requirement for heavy working of the tile mix imparts stress to the mix which can result in dimensional instability in the finished tile. For example, after installation, individual tiles may shrink, resulting in open seams which are unsightly and collect dirt brought in by normal traffic conditions.

I have found that outstanding plastic asbestos floor tile can be manufactured by a method which includes the use of light duty mixing equipment when the binder is comprised of a mixture of rosin-ester modified phenol-formaldehyde resin and vinyl resin, such as polyvinyl chloride and copolymers of vinyl acetate and vinyl chloride. In the tiles of my invention, the resin component of the binder contains from about 10% to about 40% by weight of vinyl resin such as polyvinyl chloride and/or its equivalent, the remainder being substantially completely rosin-ester modified phenol-formaldehyde resin. These resins contribute highly desirable properties to the finished tile.

The tiles of my invention are characterized by excellent resistance to household and industrial oils and greases, light fast colors which resist the effect of ultraviolet radiation, dimensional stability, good strength, and flexibility. In addition to these outstanding characteristics, the materials can be readily manufactured on low power equipment which has been used for many years in the manufacture of asphalt tile. Good patterns are readily obtained, and the tiles are free from blisters and other surface irregularities.

The rosin-ester modified phenol-formaldehyde resin is obtained by condensing rosin with the B-stage reaction product of phenol and formaldehyde and thereafter esterifying with a mixture of equal parts by weight of a polyhydric alcohol such as ethylene glycol or glycerine. The phenol and formaldehyde are reacted in a ratio of 1 mole of phenol with an amount of formaldehyde falling within the range of 1 mole to 1.2 moles. The rosin is condensed with the B-stage phenol-formaldehyde reaction product in the weight ratio of 1.2 to 1.5 parts of rosin to 1 part of phenol-formaldehyde reaction product. The esterification with an excess of the ethylene glycol-glycerine mixture is carried out until the ring and ball melting point of the resin product obtained falls within the range of 138° C. to 142° C. The rosin-ester modified phenol-formaldehyde resin so formed has a molecular weight between 1200 and 1500.

The physical characteristics of the phenol-formaldehyde resin can be modified by varying the ratio of phenol to formaldehyde or by replacing phenol partially or entirely with alkyl substituted phenols such as cresols and paratertiary amyl phenol, etc.; by varying the ratio of rosin to phenol-formaldehyde; by using a variety of polyhydric alcohols singly or in combination; by using a mixture of rosin and a minor amount of maleic anhydride; by carrying the esterification to a higher or lower melting point than the range specified above; etc. The mechanics of the resin production and physical property variations is well-known to the art and forms no part of my invention.

Typical of the rosin-ester modified phenol-formaldehyde resins suitable for carrying out this invention are Filtrez 170 Resin, manufactured and sold by Filtered Rosin Products Company, Inc.; Mastolyn Resin, manufactured and sold by Hercules Powder Company; and Beckacite Resin P-652, manufactured and sold by Reichhold Chemicals Company, Inc.

These resins are well-known in the art and form no part of my invention.

The rosin-ester modified phenol-formaldehyde resins are mixed with any of the well-known vinyl resins, such as resinous vinyl chloride polymers, for example, polyvinyl chloride and copolymers of vinyl chloride and vinyl acetate. Generally speaking, commercially available copolymers contain from 85% to 90% vinyl chloride and 10% to 15% vinyl acetate. In some instances, commercial copolymers have been modified with such reactants as maleic anhydride, a typical commercial copolymer being one containing 87% vinyl chloride, about 12% vinyl acetate, and about 1% maleic anhydride modifying agent. Of course, mixtures of such resins may be employed in the practice of my invention.

The resin mixture described above is suitably plasticized with any well-known plasticizer or mixture of plasticizers. Typical of the plasticizers which may be used are butyl benzyl phthalate, mixed ortho and para ethyl toluene sulfonamides, phthalyl glycollates, and the like. Generally speaking, these plasticizers are such as avoid decreasing the grease resistance and alkali resistance of the finished product.

The filler materials employed in the composition of my invention are advantageously a mixture of fine filler, such as ground limestone, serpentine, talc, and the like; and fibrous filler, such as asbestos and the like. Ordinarily, I employ a composition containing about 70% to about 80% by weight filler and about 20% to about 30% by weight binder. Pigments may be used in the tile to produce the desired color effects. Pigments such as titanium oxide, carbon black, iron oxide, ochre, or other well-known pigments can be used. The filler component of my invention generally contains about 20% to about 50% by weight fibrous filler such as asbestos, and about 30% to about 60% by weight fine filler. The pigments are normally included in the fine filler in determining the quantities of ingredients present in the composition.

In order to obtain the desired properties of the tile, which properties include the physical properties mentioned hereinabove and the ability to be worked on light duty equipment, I find that the proportions of the various ingredients are advantageously maintained within certain limits as follows:

| | Percent | |
|---|---|---|
| Fine filler and pigments | 30 to 60 | 70%–80% filler |
| Asbestos | 20 to 50 | |
| Plasticizers | 5 to 10 | |
| Vinyl resin | 2 to 8 | 30%–20% binder |
| Rosin-ester modified phenol-formaldehyde resin having a ring and ball melting point of 105° C. to 142° C. | 10 to 18 | |

In accordance with my invention, all of the ingredients are charged to a mixer and mixed at temperatures up to about 310° F. While the time required to accomplish the desired mixing may vary, depending upon the temperature of the operation of the mixer, the first stage mixing normally requires about 25 to about 27 minutes when the steam pressure in the mixer jacket is about 110 to about 120 pounds per square inch. The mixed ingredients are then placed upon a mill to form what is known in the art as a blanket. The conditions of blanket formation are advantageously such that the cold roll is maintained at a temperature of about 165° F. to about 180° F. and the hot roll at about 315° F. to about 330° F. After the blanket is removed from the cold roll, it is passed through at least one calender to give the sheet the finished surface. In passing through the calender, the face roll is maintained at a temperature of about 110° F. to about 120° F. and the bottom roll at a temperature of about 85° F. to about 95° F. Following passage through the calender, the material is cooled by means of water, air, or both, and is then cut into the tile shape. Generally speaking, it is advantageous to bring the mass down to a temperature in the range of about 120° F. to about 130° F. before severing the sheet into tiles.

In order to more fully understand my invention, reference is made to the following specific examples:

*Example I*

The following composition was made into tiles by the procedure described above:

| | Parts by weight |
|---|---|
| Polyvinyl chloride | 2.5 |
| Rosin-ester modified phenol-formaldehyde-maleic anhydride reaction product having ring and ball melting point of 115° C. to 125° C. | 13.8 |
| Butyl benzyl phthalate | 3.7 |
| Mixed N-ethyl ortho and para toluene sulfonamide | 3.0 |
| Asbestos fibers | 30.0 |
| Limestone and pigment | 47.0 |

*Example II*

The following composition was made into tiles by the procedure described above:

| | Parts by weight |
|---|---|
| Copolymer containing 13% vinyl acetate and 87% vinyl chloride | 5 |
| Rosin-ester modified phenol-formaldehyde-maleic anhydride reaction product having ring and ball melting point of 115° C. to 125° C. | 11.5 |
| Butyl benzyl phthalate | 3.5 |
| Mixed N-ethyl ortho and para toluene sulfonamide | 2.0 |
| "Paraplex G-60" (epoxidized soya bean oil) | 1.0 |
| Asbestos fibers | 30.0 |
| Limestone and pigment | 47.0 |

Tiles produced in accordance with my invention are flexible and smooth surfaced. They are highly resistant to household and industrial oils and greases, as well as alkali, and are free from tendency to curl. One outstanding characteristic of these tiles which is lacking in many prior art vinyl base tiles is that these tiles are dimensionally stable. The tiles are characterized by good graining and smooth surface. While my invention has been described with particular reference to a floor tile, the materials may also be used as a wall tile.

I claim:

1. A resilient tile containing about 30% to about 60% by weight of fine filler, about 20% to about 50% by weight asbestos, about 2% to about 8% by weight of a vinyl resin selected from the group consisting of polyvinyl chloride and copolymers of vinyl chloride and vinyl acetate, about 10% to about 18% by weight of rosin-ester modified phenol-formaldehyde resin having a molecular weight between 1,200 and 1,500 formed by condensing 1.2 to 1.5 parts of rosin with the B-stage reaction product of 1 to 1.2 parts of phenol and 1 part of formaldehyde and esterified with a polyhydric alcohol selected from the group comprising ethylene glycol and glycerine, and having a softening point of 105° C. to 142° C., and about 5% to about 10% by weight plasticizer selected from the group consisting of butyl benzyl phthalate, mixed ortho and para ethyl toluene sulfonamides, and phthalyl glycollates for the resin.

2. A resilient tile composition containing the following ingredients in substantially the following percentages by weight:

| | Percent |
|---|---|
| Vinyl chloride resin | 2.5 |
| Rosin-ester modified phenol-formaldehyde resin having a molecular weight between 1,200 and 1,500 formed by condensing 1.2 to 1.5 parts of rosin with the B-stage reaction product of 1 to 1.2 parts of phenol with 1 part of formaldehyde and esterified with polyhydric alcohol selected from the group consisting of ethylene glycol and glycerine and having a melting point between 105° C. and 142° C. | 13.8 |
| Butyl benzyl phthalate | 3.7 |
| Mixed N-ethyl ortho and para toluene sulfonamide | 3.0 |
| Asbestos | 30.0 |
| Limestone and pigment | 47.0 |

3. A resilient tile composition containing the following ingredients in substantially the following percentages by weight:

| | Percent |
|---|---|
| Vinyl chloride resin | 5 |
| Rosin-ester modified phenol-formaldehyde resin formed by condensing 1.2 to 1.5 parts of rosin with the B-stage reaction product of 1 to 1.2 parts of phenol with 1 part of formaldehyde and esterified with polyhydric alcohol selected from the group comprising ethylene glycol and glycerine and having a melting point between 105° C. and 142° C. | 11.5 |
| Butyl benzyl phthalate | 3.5 |
| Mixed N-ethyl ortho and para toluene sulfonamide | 2.0 |
| Epoxidized soya bean oil | 1.0 |
| Asbestos fibers | 30.0 |
| Limestone and pigment | 47.0 |

References Cited in the file of this patent

UNITED STATES PATENTS

| | | |
|---|---|---|
| 1,709,490 | Rosenblum | Apr. 16, 1929 |
| 2,400,718 | Siegel | May 21, 1946 |
| 2,428,282 | Kemmler | Sept. 30, 1947 |
| 2,459,651 | Jones | Jan. 18, 1949 |
| 2,471,629 | Krumbhaar | May 31, 1949 |
| 2,502,457 | Heckler | Apr. 4, 1950 |
| 2,510,837 | Schrimpe | June 6, 1950 |
| 2,516,351 | Stanford | July 25, 1950 |

OTHER REFERENCES

Hercules, Synthetic Resins, pages 9–14, Hercules Powder Co., Wilmington, Del. (1949), Hercules Dig., Div. 50. (Copy in S. L.)

Clark et al.: Rubber Age, pages 343–5, vol. 72, No. 3, December 1952.

Greenspan et al.: Ind. and Eng. Chem., pages 2722–6, vol. 45, No. 12, December 1953.